(12) United States Patent  
Bonin (10) Patent No.: US 6,239,952 B1  
(45) Date of Patent: May 29, 2001

(54) MICROACTUATOR SUSPENSION WITH MULTIPLE "I" SHAPED MICROBEAMS

(75) Inventor: Wayne Allen Bonin, North Oaks, MN (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 09/048,750

(22) Filed: Mar. 26, 1998

Related U.S. Application Data (60) Provisional application No. 60/067,703, filed on Dec. 4, 1997.

(51) Int. Cl.$^7$ ....................................................... G11B 5/56
(52) U.S. Cl. .......................................................... 360/294.4
(58) Field of Search ................................. 360/104, 294.1, 360/294.2, 294.3, 294.4, 294.6; 29/896.9

(56) References Cited

U.S. PATENT DOCUMENTS

| | | | |
|---|---|---|---|
| 5,764,444 | * | 6/1998 | Imamura et al. ...................... 360/109 |
| 5,896,246 | * | 4/1999 | Budde et al. .......................... 360/104 |
| 5,898,541 | * | 4/1999 | Boutaghou et al. .................. 360/109 |

OTHER PUBLICATIONS

Fan et al, "Mangetic Recording Head Positioning at Very High Track Densities Using a Microactuator–Based Two–Stage Servo System", Jun. 1995, IEEE Transactions, pp. 222–233.*

* cited by examiner

*Primary Examiner*—David Davis
(74) *Attorney, Agent, or Firm*—Kinney & Lange, P.A.

(57) ABSTRACT

A suspension supports a slider for use with a microactuator. The suspension includes a suspension arm attachment pad and a slider attachment pad, connected together by microbeams. A first plurality of microbeams run side-by-side and extend on one side of the suspension, and a second plurality of microbeams run side-by-side and extending on the other side of the suspension. The microbeams preferably include a web and at least one flange which is wider than the web, such as in an "I" shape. The suspension is fabricated out of a single crystal silicon wafer with photolithographic techniques, including doping a surface of the wafer and etching the interior of the wafer to form the "I" shaped microbeams. The microbeams of the present invention make the suspension more flexible in the lateral direction while supporting the preload force on the slider in the vertical direction.

16 Claims, 6 Drawing Sheets

MICROACTUATOR SUSPENSION WITH MULTIPLE "I" SHAPED MICROBEAMS

CROSS-REFERENCE TO RELATED APPLICATION(S)

This application claims the benefit of provisional application No. 60/067,703 filed on Dec. 4, 1997, entitled USING "I" SHAPED BEAMS TO INCREASE THE VERTICAL LOAD CAPACITY TO LATERAL STIFFNESS RATIO IN A MICROACTUATOR, AND METHOD OF FABRICATION.

BACKGROUND OF THE INVENTION

The present invention relates to suspension assemblies for microactuators In particular, the present invention relates to suspension assemblies for air bearing sliders which have a microactuator positioning the air bearing slider relative to a suspension arm in a disc drive.

Magnetic discs are commonly used to store information in computer devices. Each side of the disc has its own associated magnetic head assembly used for reading and writing information thereon. To record information on the disc, the write head creates a highly concentrated magnetic field. During writing, the strength of the concentrated magnetic field directly under the write head is greater than the coercivity of the recording medium (known as "saturating" the medium), and grains of the recording medium at that location are magnetized with a direction which matches the direction of the applied magnetic field. The grains of the recording medium retain their magnetization after the saturating magnetic field is removed. As the disc rotates, the direction of the writing magnetic field is alternated based on bits of the information being stored, thereby recording a magnetic pattern on the track directly under the write head.

Each magnetic head assembly is mounted on the end of a support or actuator arm, which positions the head directly adjacent the disc surface. If the actuator arm is held stationary, the magnetic head assembly will pass over a generally circular path on the disc known as a track, and information can be read from or written to that track. Each concentric track has a unique radius, and reading and writing information from or to a specific track requires the magnetic head to be located above the track. By moving the actuator arm, the magnetic head assembly is moved radially on the disc surface between tracks.

Each magnetic head assembly is typically connected to its respective actuator arm by a flexure or "suspension" arm. The suspension arm functions as a bending spring to bias the magnetic head assembly toward the disc surface. For instance, the suspension arm may bias the magnetic head assembly toward the disc with a preload force of 4 grams in a "vertical" direction.

The magnetic head assembly includes a portion known as a "slider". As the disc pack rotates at high speed (typically in excess of 10 m/s relative to the slider), the aerodynamic properties of the slider cause the magnetic head assembly to "fly" above its respective disc surface. When the disc drive is turned off, the slider containing the read/write transducer lands and rests on the disc until the disc drive is again started up.

At all times, the suspension arm applies the vertical preload force to the slider. When the power is switched on in a disc drive, the suspension arm applies a longitudinal force to the slider to overcome the static friction or "stiction" force on the slider. During use, the suspension arm applies longitudinal force to the slider responsive to the drag force associated with the slider's dynamic friction contact with the air and/or disc. The suspension arm may also apply pitch, roll and yaw forces to keep the slider at a desired attitude relative to the disc surface.

The computer industry continually seeks to reduce the size of computer components and to increase the speed at which computer components operate. To this end, it is desired to reduce the size required to magnetically record bits of information. It is concomitantly important to maintain the integrity of the information as size is decreased, and magnetic storage of information must be virtually 100% error free.

To reduce size and increase storage capacity in magnetic disc drive units, magnetic discs have been stacked in a "pack" all carried within the same disc drive unit. All of the discs are connected together on a single spindle and rotate about the same axis. To further increase space savings in the disc drive unit, all of the actuator arms are connected together and pivot about the same pivot point. A single servomotor typically controls all of the actuator arms and their associated magnetic heads. This configuration is identified as an "E-block", which refers to the "E" type of shape formed by the adjacent arms and the servomotor/pivot assembly. To further increase space savings in the disc drive unit, the thickness of discs and the axial spacing between discs has been compressed.

Several parameters of the disc drive system are critical for increasing storage density for a given area of disc space. Higher coercivity in the magnetic media and smaller head to media spacing lead to smaller transition size and increased storage density. Smaller width or minimum separation between adjacent tracks on the disc also increases storage density. However, each track must be readable by the read head without interference or cross-talk from adjacent tracks. Each track must also be able retain its recorded information without alteration during writing of adjacent tracks. Present track spacing of commercially available discs is in the range of 5,000 to 10,000 tracks per radial inch, e.g., each track has a width of about 2.5 to 5 microns (25,000 to 50,000 Angstroms).

The disc drive must be able to differentiate between tracks on the disc and to center the magnetic head over any particular track. Most disc drives use embedded "servo patterns" of recorded information on the disc. The servo patterns are read by the magnetic head assembly to inform the disc drive of track location. "Off track errors" result from a number of factors inherent in the disc drive system. The major source of off track error is the spindle motor bearings. Self-induced vibration of the spindle is caused by the rotating disc stack, and gets worse with increasing number of discs on the stack Actuator arm bearings introduce error, and flex cables may exert bias forces on the slider. Residual vibration also contributes to off track error. There are other non-mechanical sources of off track errors as well, such as defects in the media, non-linearity in the several patterns, etc. In addition to internal sources, one other major source of off track error is vibration and shock from outside the drives, such as from an unbalanced cooling fan of the PC. With these off track errors, servo patterns are also used to continually correct to a centered position over the desired track.

As track width decreases, it becomes more and more important for the magnetic head to be consistently and accurately positioned over the track. One method to increase the positioning accuracy of the slider is through a microactuator positioned between the suspension arm and the slider. The microactuator "piggy backs" in dual stage performance in addition to the macro positioning provided by the actuator arm. The microactuator allows fine level tracking of each individual transducer without movement of the actuator arm, and allows an increase in the correction frequency.

The ideal microactuator for magnetic disc drives should have minimal height or thickness (to preserve disc to disc packaging advantage) minimal width (to maximize useable real estate), minimal mass (to maintain high access speed during movement of the actuator arm), and minimal added cost.

Proposed microactuators include a pad for attachment to the suspension arm and a pad for attachment to the slider separated by some sort of microspring structure. The suspension arm pad and the slider arm pad are then moved relative to each other by a small electromagnet or micro-coil. To meet the desired size and heating constraints, the microcoil may be capable of producing a force of on the order of 100 $\mu$N for continuous duty and up to about 1 mN for short pulses, across a 10$\mu$m gap. The force produced is inversely proportional to the square of the gap, so a smaller gap will permit larger forces for a given maximum current. The structure of the microactuator is further discussed in Application No. 169-12.340 entitled MAGNETIC MICROACTUATOR AND INDUCTIVE SENSOR HAVING SHAPED POLE CONFIGURATION, assigned to the assignee of the present invention and incorporated herein by reference.

Depending on the microbeam or microspring structure, the microactuator may be rotary or lateral A rotary microactuator rotates or pivots the slider about a central vertical slider axis to finely position the transducer. A lateral microactuator moves the slider laterally to finely position the transducer. Rotary motion has some potential advantages including faster possible positioning for the same force input, if the point of rotation is near the center of mass of the slider, and also reduced sensitivity to disturbances generated by the primary servo or voice coil motion. However, in part as a consequence of the desire to keep the entire structure narrow, convenient spring designs tend to produce linear rather than rotary motion.

The magnitude of the displacement force in the lateral direction should be minimal to permit sufficient flexibility in the direction of desired motion to correct the lateral position of the slider. At the same time, the microbeam or microspring structure must be stiff enough in the vertical and longitudinal directions to withstand and transit the necessary preload, drag, pitch, roll and yaw forces on the slider with minimal vibration.

The suspension arm pad, the slider arm pad and the microbeam or microspring structure may all be integrally formed of single crystal silicon or similar structure. The microbeam or microspring structure needs to provide a consistent displacement force so the microcoil can accurately adjust the position of the slider. Any fracture of the single crystal silicon material, caused typically by surface defects, greatly affects the displacement force and is a significant, possibly fatal, problem.

BRIEF SUMMARY OF THE INVENTION

The present invention is a suspension for supporting a slider for use with a microactuator, and a method of forming the suspension. The suspension includes a suspension arm attachment pad and a slider attachment pad, connected together by microbeams. In one aspect, a first plurality of microbeams run side-by-side and extend on one side of the suspension, and a second plurality of microbeams run side-by-side and extending on the other side of the suspension. In another aspect, the microbeams include a web and at least one flange which is wider than the web, such as in an "I" shape. The microbeams of the present invention make the suspension more flexible in the lateral direction while supporting the preload force on the slider in the vertical direction.

DETAILED DESCRIPTION OF THE PREFERRED EMBODIMENTS

Figure 1:
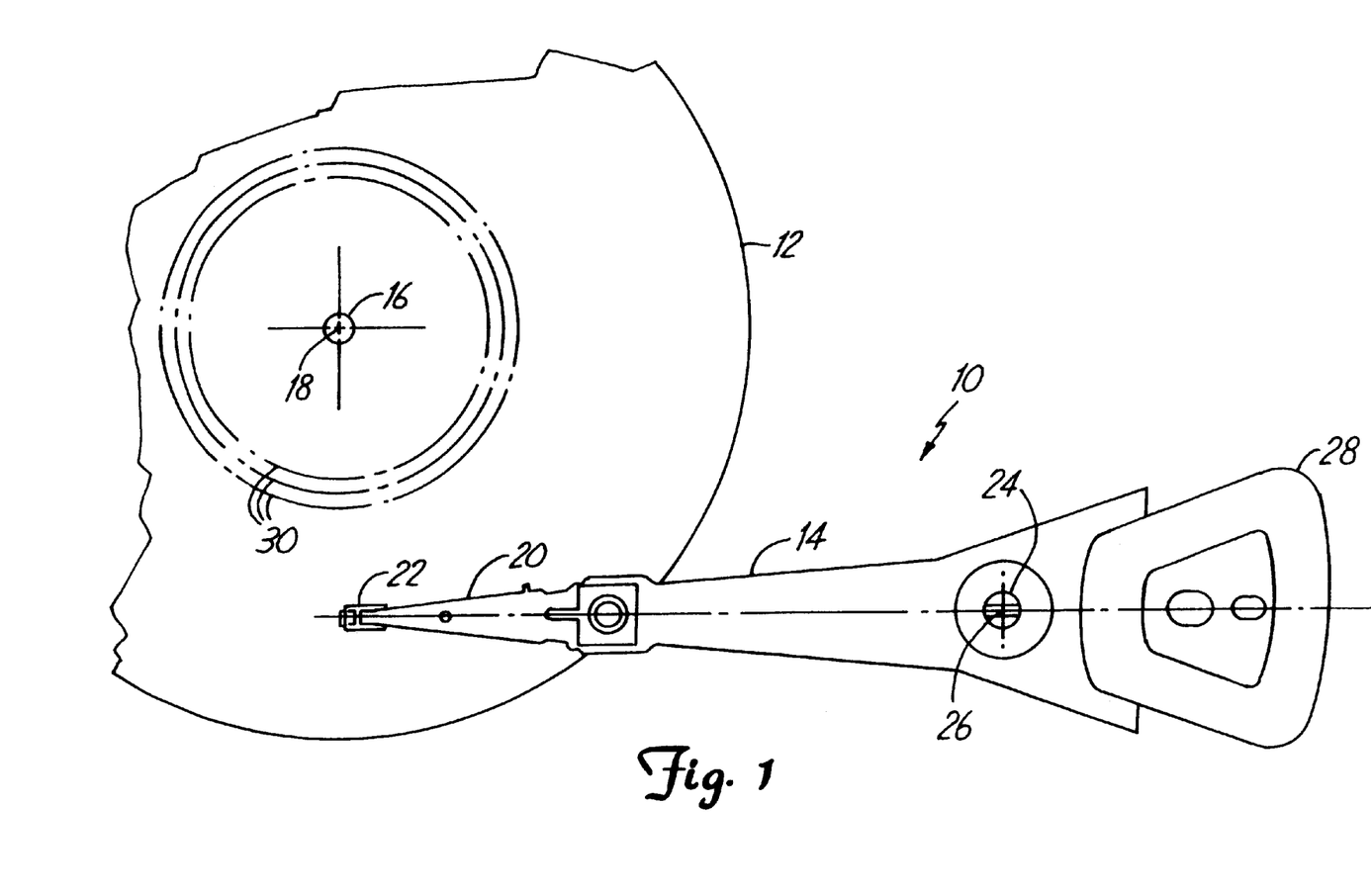
FIG. 1 is a plan view of a disc drive.

FIG. 1 represents a disc drive structure 10, including a disc 12 and an actuator arm 14. During use of the disc drive 10, a drive spindle 16 rotates the disc 12 about axis 18. The actuator arm 14 carries a flexure arm or suspension arm 20, which supports a slider 22 adjacent a surface of the disc 12. A read/write transducer (not independently shown) is mounted on the slider 22, to read information from the disc 12 and write information to the disc 12. As known in the art, a disc drive may include a plurality of the disc drive structures 10 depicted in FIG. 1, such that the disc 12 is only one disc in a disc stack or "disc pack", and actuator arm is only one arm in an E-block. Multiple disc packs each with their own E-block actuator arms may be part of a single disc drive or a single computer device.

As the disc 16 rotates about the drive spindle 18 at a high speed such as 10 m/s or higher relative to the slider 22, the aerodynamic properties of the slider 22 cause it to "fly" above the surface of the disc 12. The flying height of the slider 22 above the disc 12 is a function of the speed of rotation of the disc 12, the aerodynamic lift of the slider 22, and the spring tension in suspension arm 20.

The actuator arm 14 is pivotable via a pivot spindle 24 about pivot axis 26, such as with a voice coil 28. By pivoting of the actuator arm 14, the slider 22 changes radial position or moves laterally between concentric "tracks" 30 on the disc 16. While the voice coil 28 may be quite accurate in radially positioning the slider 22 on the disc 12, the density of tracks 30 may be too high for the accuracy of the voice coil 28, and various off-track errors as previously discussed may require a higher resolution and frequency response in positioning the slider 22 precisely over a selected track 30 of the disc 12.

Figure 2:
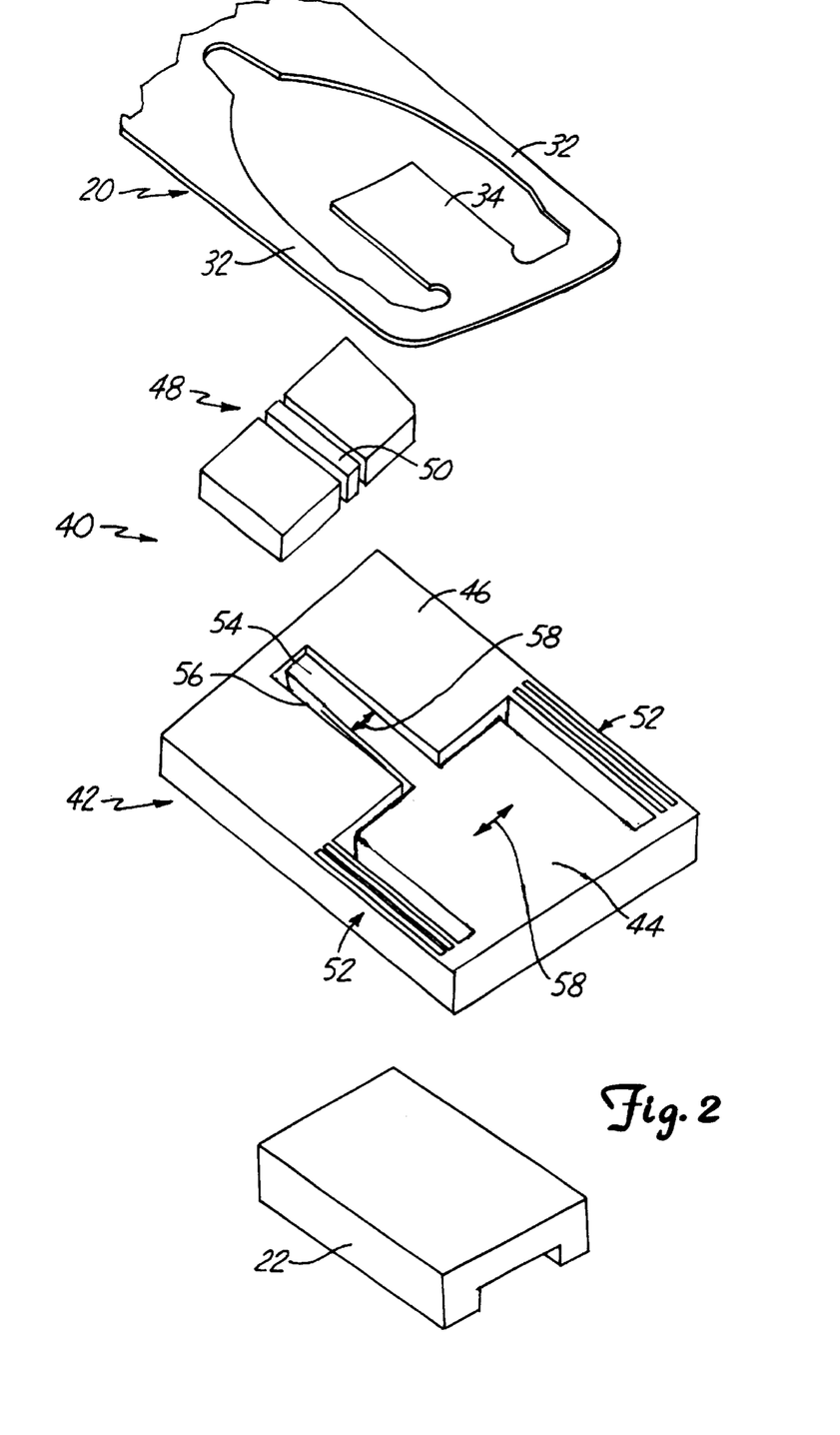
FIG. 2 is an exploded perspective view of a microactuator with respect to the air bearing slider and suspension arm.

FIG. 2 is an exploded perspective view of a portion of the disc drive system 10 shown in FIG. 1, showing the suspension arm 20 and the slider 22 in more detail. The suspension arm 20 may include two vertical spring arms 32 extending to a central pad 34. The vertical spring arms 32 provide resilience and gimbaling spring to the suspension arm 20 in the vertical direction (i.e., toward and away from the disc 12), to provide an appropriate preload force biasing the slider 22 toward the disc 12. The slider 22 includes an appropriately contoured air bearing surface to generate a lift force off from the disc 12.

A microactuator system 40 is preferably disposed between the suspension arm 20 and the slider 22. The microactuator 40 includes a suspension 42 having a slider attachment pad 44 which can move laterally with respect to a suspension arm attachment pad 46. The slider 22 is rigidly secured to the slider attachment pad 44 such as through adhesive or any other method known in the art. The suspension arm attachment pad 44 is similarly rigidly secured relative to the suspension arm 20 such as at central pad 34.

The microactuator system 40 is preferably thin to provide as little vertical separation as possible between the suspension arm 20 and the slider 22. This is particularly important in disc packs, where any thickness added by the microactuator 40 is multiplied by the number of sliders 22 used to determine the thickness added to the disc drive. For instance, in a disc pack with fourteen discs 12 and twenty-eight sliders 22, a vertical clearance for each microactuator 40 of only 250 µm results in an added thickness of 7 mm to the disc drive.

The microactuator 40 system also includes a biasing mechanism 48 (shown schematically and not to scale in FIG. 2) to control and adjust the lateral position of the slider attachment pad 44 relative to the suspension arm attachment pad 46. The microactuator system 40 provides high frequency, fine lateral position control of the slider 22 and the magnetic recording head thereon, without significantly affecting the suspension of the slider 22 in the vertical direction.

Figure 3:
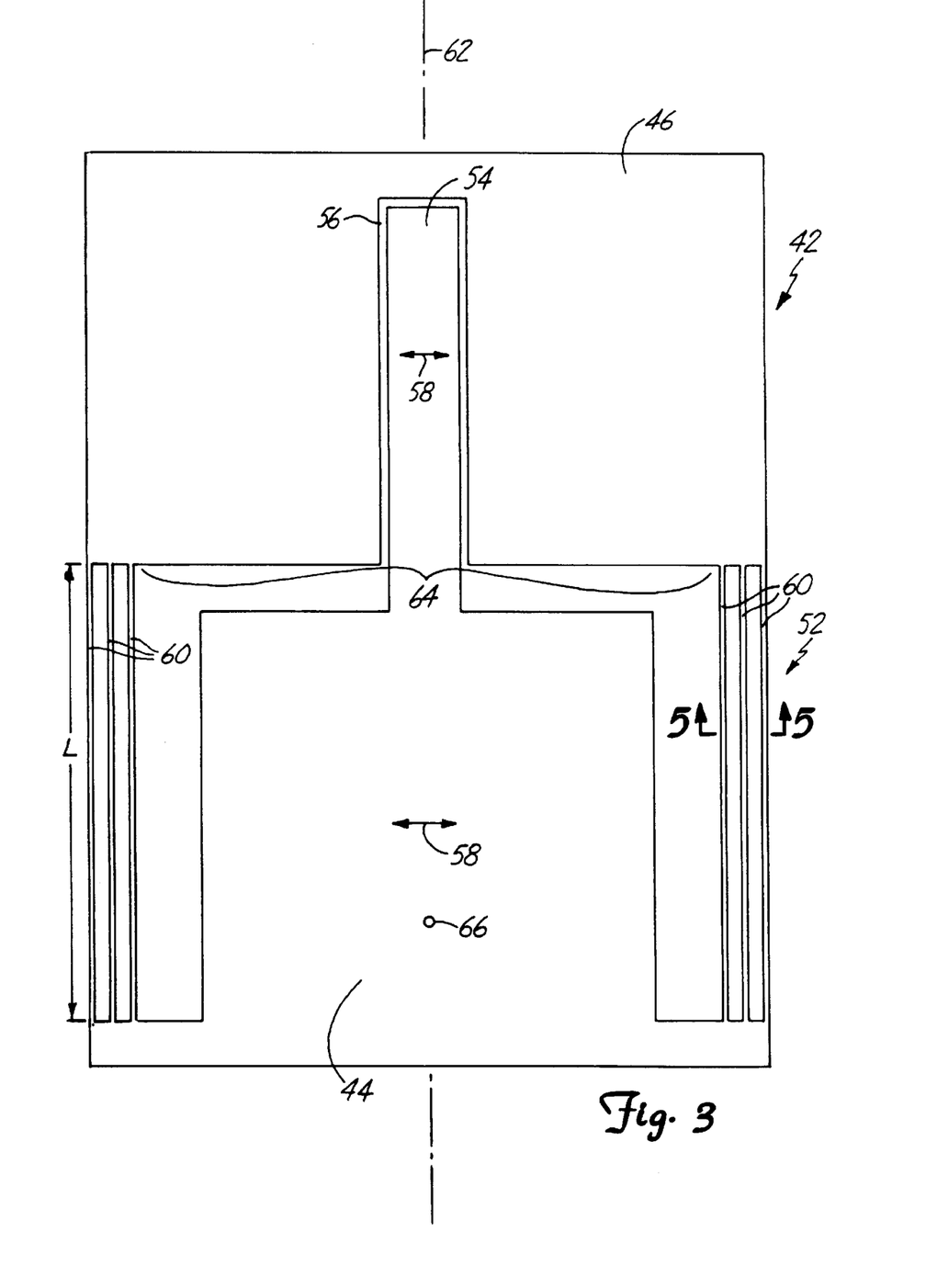
FIG. 3 is a plan view of a first suspension device according to the present invention.
Figure 4:
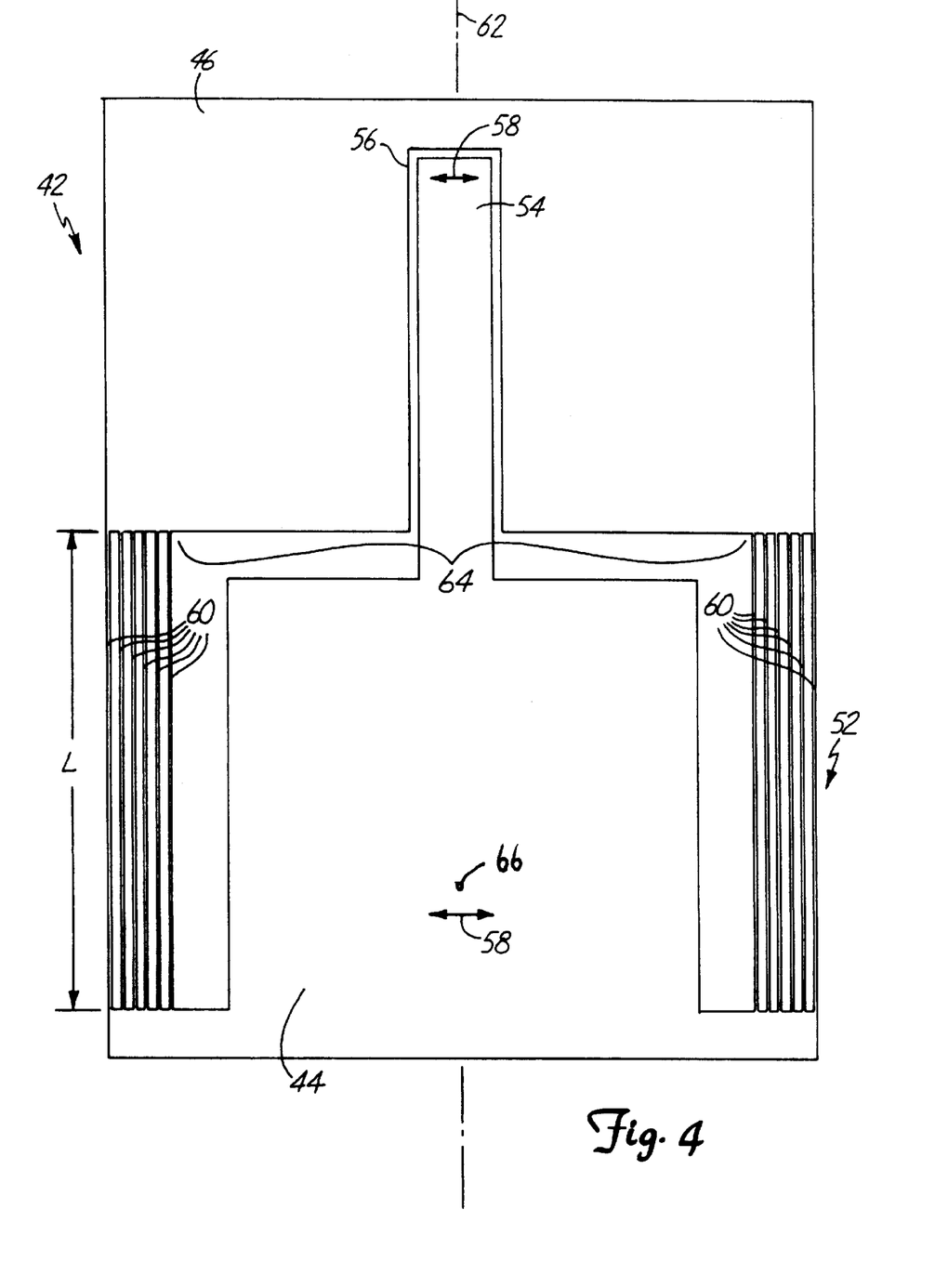
FIG. 4 is plan view of a second suspension device according to the present invention.

The design of the biasing mechanism 48, the slider attachment pad 44 and the suspension arm attachment pad 46 can be widely modified as necessary for the particular system. The attachment pads 44, 46 shown in FIGS. 2–4 represent only one possible configuration for attachment pads, and workers skilled in the art will understand that any design of attachment pads can be equivalently used with the present invention. For instance, the attachment pads 44, 46 could be made thinner than shown in FIG. 2, or slider attachment pad 44 and/or suspension arm attachment pad 46 could be in different (not necessarily parallel) planes from each other and relative to the microactuator 40, or the attachment pads 44, 46 could attach to the suspension arm 20 and/or the slider 22 from other directions such as from the sides rather than from the top and bottom.

The biasing mechanism 48 may include a small electromagnet or magnetic coil of any type known in the art. The small magnetic coil may be magnetically coupled to a magnetic portion 50 (shown schematically and not to scale in FIG. 2) on the slider attachment pad 44 to magnetically bias the slider attachment pad 44 relative to the suspension arm attachment pad 46 in the lateral direction. The magnetic coil acts across a small gap to the magnetic portion 50 on the slider attachment pad 44, and the gap must be at least as great as the maximum lateral deflection of the microactuator 40. At present, due to overheating concerns and core saturation, magnetic biasing mechanisms 48 can generate only a small force. For instance, assuming a 10 µm gap, the lateral biasing force for continuous duty may have a maximum on the order of 100 µN, and the lateral biasing force for short pulses may have a maximum of up to about ten times this amount, or about 1 mN.

FIG. 3 shows a first embodiment of the suspension 42 of the present invention in more detail. The slider attachment pad 44 is connected to the suspension arm attachment pad 46 by a microspring structure 52. A tongue 54 extends from the slider attachment pad 44 into a gap 56 in the suspension arm attachment pad 46. The magnetic coil of the biasing mechanism 48 (not shown in FIG. 3) may be secured to the suspension arm attachment pad 46, and a magnetic structure 50 such as a layer of permalloy (not shown in FIG. 3) may be attached to the tongue 54. The biasing mechanism 48 thus controls lateral position of the slider 22 by moving the slider attachment pad 44 in the direction shown by arrows 58. The amount of lateral movement is controlled by the strength of the magnetic force created by the biasing mechanism 48 and the stiffness of the microspring 52.

The biasing mechanism 48 preferably has travel limits in the lateral direction. The travel limits prevent over-deflection of the microspring 52 in the lateral direction. Absent travel limits, such over-deflection may occur such as during the large acceleration induced by the voice coil 28 during high speed accessing the slider 22 across the disc 12. The motor in some magnetic microactuators 48 automatically provides such a travel limit.

The preferred microspring 52 includes two groups of microbeams 60, one on each side of a longitudinal axis 62 of the suspension 42. Each group preferably includes a plurality of individual microbeams 60. In the preferred embodiment shown in FIG. 3, six microbeams 60 are used, three on each side of the slider attachment pad 44. In the preferred embodiment shown in FIG. 4, twelve microbeams 60 are used in two groups of six. The total number of microbeams 60, the number of microbeams 60 in each group, and the number of groups of microbeams 60 can be selected to achieve the desired performance characteristics for the microspring 52.

Each microbeam 60 is preferably straight and parallel to the others, such that the microbeams 60 in each group run side-by-side. Each microbeam 60 preferably has the same thickness, width and length as the other microbeams 60, and the thickness and width of each microbeam 60 are preferably longitudinally constant. Because each of the microbeams 60 is identically shaped, each microbeam 60 will undergo the same stress, equally share the load, and deflect the same amount for a given lateral biasing force from the biasing mechanism 48. Because each of the microbeams 60 is longitudinally constant and straight without any bends, bending stress concentrations are minimized and deflection occurs in a spread manner across the length of each microbeam 60. As a result, there are no points of weakness or likely breakage along the length of the microbeams 60.

Should a surface defect occur in the microbeams 60 of the present invention, the suspension 42 of the present invention further prevents catastrophic failure. That is, propagation of a defect will not occur from one microbeam 60 to neighboring microbeams 60. A surface defect can therefor only cause fracture of a single microbeam 60.

Moreover, should a defect occur on the surface of one microbeam 60, the present invention helps to prevent the defect from propagating entirely through and fully cracking that microbeam 60. When a surface defect is present in the present invention, the surface defect increases the relative flexibility of the microbeam 60 with the surface defect relative to the other microbeams 60, so the other microbeams 60 bear a proportionately greater percentage of the vertical load. With decreased vertical load on the microbeam 60 with the surface defect, the surface defect does not propogate entirely through and fully crack that microbeam 60. Instead, the microbeam 60 with the surface defect remains intact, just with greater flexibility and a smaller cross-sectional area to bear the load in both the lateral and vertical directions.

Particularly because the power applied to the biasing mechanism 48 will typically be controlled based on a feedback loop from the servo signal read by the head, a surface defect in or even fracture of a single microbeam 60 will typically not be fatal to the microactuator 40. Instead, the power applied to the biasing mechanism 48 will automatically be adjusted by the feedback loop to compensate for the difference in lateral spring constant. However, surface defects and/or fracture to any of the microbeams 60 will be detrimental to the system. Fracture of a microbeam 60 may create particulate debris which can cause problems in the disc drive. In that the surface defect or fracture of a single microbeam 60 will necessarily decrease the vertical spring constant on one side of the slider attachment pad 44 more that on the other side, the surface defect or fracture of a single microbeam 60 will likely induce an undesirable roll angle in the slider 22. The more microbeams 60 used, the less damage caused by a surface defect or fracture of a single microbeam 60.

The microbeams 60 are preferably oriented to run longitudinally. That is, the longitudinal axis of each of the microbeams 60 is parallel to the longitudinal axis 62 of the suspension 42, and the biasing mechanism 48 is aligned relative to the tongue 54 provide only a lateral biasing force with no longitudinal component. The slider 22 is preferably aligned with its longitudinal axis coincident or at least parallel with the longitudinal axis 62 of the suspension 42, such that activation of the microactuator 40 results in movement of the slider 22 in a lateral direction with no longitudinal component. The skew angle relationship of the slider 22 relative to the disc 12, which is known for any given radius, can then be used to correlate the amount of lateral movement of the slider 22 needed for a desired radial or trackwise movement of the slider 22.

The microbeams 60 are fabricated integrally with the suspension arm attachment pad 46 and the slider attachment pad 44. For instance, the preferred structure is fabricated out of a single crystal silicon wafer. Being fabricated out of a single integral structure, each of the microbeams 60 has an ideal cantilevered attachment both to the suspension arm attachment pad 46 and the slider attachment pad 44. Being fabricated out of a wafer structure generally allows the simplicity and low cost two-dimensional processing. The suspension 42 could alternatively be fabricated out of other materials, or could be fabricated three-dimensionally such that all of the structure was not within a single plane. However, the single crystal silicon wafer allows use of known, low-cost fabrication methods with high level of detail.

The opposing groups of microbeams 60 are separated by a relatively large gap 64, which is at least an order of magnitude greater than the desired deflection and is preferably slightly larger than the width of the slider 22. For instance, the two groups of microbeams 60 may be separately by a gap of 1200 to 1400 $\mu$m. A large gap 64 helps the microbeams 60 to prevent pivoting of the slider attachment pad 44 and yaw of the slider 22. A large gap 64 also helps the suspension 42 to withstand roll forces of the slider 22 by increasing the moment arm of the microbeams 60 to the centroid of the slider 22. The microspring 52 with a large gap 64 thus maintains only lateral movement of the slider attachment pad 44 relative to the suspension arm attachment pad 46. Having the gap 64 larger than the width of the slider 22 allows further minimizing of the thickness of the system, as the microbeams 60 can be partly or fully within the same horizontal plane as the body of the slider 22.

Figure 5:
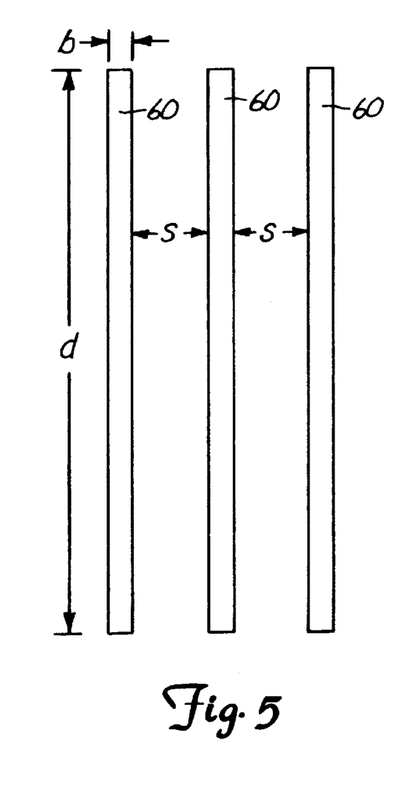
FIG. 5 is a cross sectional view of the microbeams of the suspension devices of FIG. 3 taken at line 5—5.

Within each group, each microbeam 60 is separated from neighboring microbeams 60 by a small distance s best shown in FIG. 5, which is preferably on the order of the width b of the microbeam 60. This distance s between microbeams 60 is not overly critical but should be great enough to prevent adjacent microbeams 60 from contacting each other during deflection. In general, the distance s separating each microbeam 60 should be small, but should not be so small as to possibly interfere with consistent fabrication of the microbeams 60. In the preferred embodiments, the distance s separating each microbeam 60 is selected from about 5 to 50 $\mu$m, such as about 25 $\mu$m.

The length L of each microbeam 60 is preferably significantly greater than its width b in the lateral direction, such as 30 to 500 times greater. For instance, in the preferred embodiments each of the microbeams 60 has a length L of 1000 $\mu$m. When a total of six microbeams 60 are used (FIG. 3), each microbeam 60 may have a longitudinally constant width b of 10 $\mu$m. When a total of twelve microbeams 60 are used (FIG. 4), each microbeam 60 may have a longitudinally constant width b of 5 $\mu$m. Because the microbeams 60 are very long compared to their width b, the microbeams 60 deflect easily in the lateral direction. The minimum width b of each microbeam 60 is limited only by process constraints, that is, the beam width b must exceed some minimum valve to allow it to be fabricated reliably.

As best shown in FIG. 5, the thickness d of the microbeams 60 in the vertical direction is considerably greater than the width b of the microbeams 60. The thickness d of the microbeams 60 is limited by space constraints and the desire to avoid excessive vertical separation between the slider 22 and the end of the suspension arm 20. The thickness d of the microbeams 60 in the vertical direction may also be limited by processing considerations, to make the microbeams 60 sufficiently narrow. The thickness d of the microbeams 60 in the vertical direction is preferably slightly less than the thickness of the slider 22 in the vertical direction. The bending strength of the microbeams 60 in the vertical direction must be sufficient to withstand the preload force placed on the slider 22 by the suspension arm 20. A high stiffness of the microbeams 60 in the vertical direction also helps in resisting pitch and roll forces and vibration on the slider 22. For instance, in the preferred embodiments each of the microbeams 60 has a longitudinally constant thickness d of 200 $\mu$m. This thickness d allows processing of a single crystal silicon wafer via photolithographic methods to consistently create suspensions 42 with very thin and long microbeams 60. Because the microbeams 60 have a significant thickness d, they are quite strong and resist bending in the vertical direction.

With a simple rectangular cross-section shown in FIG. 5, microbeams 60 according to the present invention can be modeled. For each of the microbeams 60 of FIG. 3, the moment of inertia in the lateral direction $I_L$ is:

$$I_L = db^3/12 = (200)(10)^3/12 = 16666 \ \mu m^4$$

For each of the microbeams 60 of FIG. 4, the moment of inertia in the lateral direction $I_L$ is:

$$I_L = db^3/12 = (200)(5)^3/12 = 2083 \, \mu m^4$$

Using known beam formulas for cantilevered beams having a guided end configuration, the deflection for each microbeam 60 is:

$$x = PL^3/12EI_L$$

where P is the end force in the lateral direction placed on each microbeam 60, such that nP is the total force exerted by the biasing mechanism 48. The spring constant for each microbeam 60 is:

$$P/x = 12EI_L/L^3$$

The total spring constant for the suspension 42 is the spring constant for each microbeam 60 times the total number of beams n:

$$nP/x = 12nEI_L/L^3$$

Assuming a <100> crystal orientation, the single crystal silicon has a modulus of elasticity E of about:

$$E = 130 \text{ GPa} = 130{,}000 \text{ MPa}$$

The microspring 52 of FIG. 3 thus has a lateral spring constant of:

$$nP/x = (12)(6)(130{,}000)(16666)/1000^3 = 156 N/m$$

The microspring 52 of FIG. 4 thus has a lateral spring constant of:

$$nP/x = (12)(12)(130{,}000)(2083)/1000^3 = 39 N/m$$

Given a maximum continuous biasing mechanism 48 force nP for the biasing device of 100 $\mu$N, the microspring 52 of FIG. 3 provides a maximum continuous lateral deflection:

$$x = nPL^3/12nEI_L = (100)(1000)^3/(12)(6)(130{,}000)(16666) = 0.64 \, \mu m$$

and the microspring 52 of FIG. 4 provides a maximum continuous lateral deflection:

$$x = nPL^3/12nEI_L = (100)(1000)^3/(12)(12)(130{,}000)(2083) = 2.56 \, \mu m$$

The maximum short pulse lateral deflection for the microactuator 40 is about ten times these amounts.

If the biasing mechanism 48 is based on a micro-coil electromagnet, the maximum lateral deflection may be further increased by the decrease in gap which results from lateral deflection. For instance, a reduction of a 10 $\mu$m gap by 2.56 $\mu$m results in a force increase of a factor of about 1.8 for the same current, which then allows further increase in the amount of maximum lateral deflection. Taking the increased lateral force due to the decrease in gap into account, the microspring 52 of FIG. 4 allows a continuous lateral deflection of any amount up to the 10 $\mu$m gap. For the microspring 52 of FIG. 3, a reduction of a 10 $\mu$m gap by 0.64 $\mu$m results in a force increase of a factor of about 1.14 for the same current. Taking the increased lateral force due to the decrease in gap into account, the microspring 52 of FIG. 3 allows a continuous lateral deflection of up to about 0.75 $\mu$m.

At the same time, the microsprings 52 of FIGS. 3–5 must withstand the vertical pre-load force placed on the slider 22 by the suspension arm 20. To maximize the vertical strength of the microsprings 52, the slider 22 should be attached to the slider attachment pad 44 with the vertical load center of the slider 22 located to maintain the slider attachment pad 44 in a parallel plane with the suspension arm attachment pad 46, roughly shown by an attachment center 66. If desired, the attachment center 66 may be slightly offset from the location that would have the slider attachment pad 44 in a parallel plane with the suspension arm attachment pad 46, to thereby better align the magnetic structure 50 between the magnetic coil of the biasing mechanism 48.

In current systems, the vertical pre-load force $W_v$ used is about 40 mN or 40,000 $\mu$N (equivalent to the gravitational force on about 4 grams). Note that this is about 400 times the amount of force placed on the microspring 52 by the biasing mechanism 48. The maximum stress $\sigma$ in the microbeam 60 will occur at a distance c from the neutral axis where c=d/2, and will be spread or divided out over each of the number of beams n. The maximum stress will be:

$$\sigma = W_v Lc/I_v n$$

For each of the microbeams 60 of FIG. 3, the moment of inertia in the vertical direction $I_v$ is:

$$I_v = bd^3/12 = (10)(200)^3/12 = 6{,}666{,}666 \, \mu m^4$$

and the maximum stress is $$\sigma = (40{,}000)(1000)(200/2)/(6{,}666{,}666)(6) = 100 \text{ MPa}$$

For each of the microbeams 60 of FIG. 4, the moment of inertia in the vertical direction $I_v$ is:

$$I_v = bd^3/12 = (5)(200)^3/12 = 3{,}333{,}333 \, \mu m^4$$

and the maximum stress is $$\sigma = (40{,}000)(1000)(200/2)/(3{,}333{,}333)(12) = 100 \text{ MPa}$$

Single crystal silicon can have a yield strength of up to about 5 to 7 GPa, but only if no defects are present. Current fabrication methods do not commercially provide defect free single crystal silicon at a viable cost, and, as previously discussed, any surface defects significantly decrease the yield strength of the single crystal silicon microbeams. Single crystal silicon has been commercially used in pressure transducers at published stresses of up to 500 MPa, and thus 500 MPa is believed to be a realistic engineering value for maximum stress in the single crystal silicon. Thus, the single crystal silicon can safely withstand this maximum fiber stress $\sigma$ of 100 MPa with a 500% safety factor, and the microspring 52 is stiff enough in the vertical direction. If a different material having a different yield strength, maximum stress and/or a different modulus of elasticity E is used for the microspring 52, appropriate dimensional adjustments should be made.

The moments of inertia in the vertical direction $I_v$ are 400 times (for the microspring 52 of FIG. 3) or 800 times (for the microspring 52 of FIG. 4) the moments of inertia of the microbeams 60 in the lateral direction $I_L$. This ratio between vertical and lateral moments of inertia ($I_v/I_L$) roughly corresponds to the ratio between continuous forces placed on the microbeams 60 in the vertical and lateral directions ($W_v/nP$), and thus the vertical deflection due to the pre-load force will be on the same order of magnitude as the maximum continous lateral deflection due to the biasing mechanism 48.

A comparison between the embodiments of FIGS. 3 and 4 shows that the number of microbeams n used does not effect the maximum vertical stress $\sigma$ in each microbeam 60, given that the total width of the microbeams bn, the thickness d and the length L of the microbeams 60 remains constant. In contrast to the maximum vertical stress σ, the lateral deflection x increases with the square of the number of microbeams n. The spring constant correspondingly decreases with the square of the number of microbeams n. Table I below shows the spring constants and lateral deflection of various other preferred designs based on changing the number of microbeams n, with the total width of the microbeams bn being kept constant at 60 μm, the thickness d of the microbeams 60 being kept constant at 200 μm, and the length L of the microbeams 60 being kept constant at 1000 μm.

TABLE I

| Number of Microbeams n | Width b (μm) | Spring Constant nP/x (N/m) | Maximum Continuous Lateral Deflection x (μm) |
|---|---|---|---|
| 2 | 30 | 1404 | 0.07 |
| 4 | 15 | 351 | 0.28 |
| 6 | 10 | 156 | 0.64 |
| 8 | 7.5 | 88 | 1.14 |
| 10 | 6 | 56 | 1.78 |
| 12 | 5 | 39 | 2.56 |
| 16 | 3.75 | 22 | 4.56 |

The greatest lateral deflection and the lowest spring constant is thus achieved with using many narrow microbeams 60.

Comparison can also be made considering increasing the thickness d of the microbeams 60 as space and fabrication permits. substituting in the above-given formulas:

$$\sigma = W_v Lc/I_v n, \; c=d/2 \text{ and } I_v = bd^3/12;$$

$$\sigma = 6W_v L/bd^2 n.$$

The maximum vertical stress σ in the microbeams 60 decreases proportionally with the square of the microbeam thickness d and with the total width bn of the microbeams 60. As an example, doubling the microbeam thickness d allows the total width bn of the microbeams 60 to be decreased by a factor of four without affecting the maximum vertical stress σ. At the same time, the substituting in the above given formulas:

$$x = nPL^3/12nEI_L \text{ and } I_L = db^3/12$$

$$x = nPL^3/nEdb^3$$

shows that lateral deflection x decreases proportionally with the microbeam thickness d and with the cube of the microbeam width b. If the same number of microbeams 60 are used, doubling the microbeam thickness d and decreasing the width b of the microbeams 60 by a factor of four results in an increase of 32 times in the amount of lateral deflection x. That is, assuming that microbeam thickness d and microbeam width b are adjusted to retain a constant maximum vertical stress σ in the microbeams 60, and without changing the number of microbeams 60, the amount of lateral deflection increases with the 5th power of the thickness d.

The lateral deflection and spring constant or lateral stiffness is not affected by the length L, since the $1/L^3$ factor is canceled by the required change in total width nb required to withstand the pre-load force. The length L does effect the lateral stress, and cannot be too short relative to the maximum lateral displacement. Also, the total width nb required to withstand the pre-load force increases with microbeam length L. Given an effective lower limit on microbeam width b, a longer microbeam length L allows an increase in the number of microbeams n. Increasing microbeam length L thus allows the stiffness to be reduced indirectly.

The preferred spring constant of the present invention is below 100 N/m. Such a low spring constant reduces excessive power dissipation produced by the biasing mechanism 48 when generating the higher forces required to overcome stiffer springs. Such a low spring constant also allows stable control over the entire travel range without requiring excessively high control bandwidth. For a large travel range, such as ±10 μm, a spring constant somewhere around 25 N/m or lower is even more preferred. The results in Table I show that such a low spring constant can be obtained by very narrow microbeams 60 of width of 3.75 μm, which may be possible with specialized etching techniques. Such low spring constants may also be obtained by increasing the thickness of the microbeams 60. In order to increase the ratio of vertical load capacity to lateral stiffness for the rectangular microbeams 60, the microbeams 60 can be made with a greater aspect ratio, that is, deeper and/or narrower.

The preferred method of fabricating the single crystal silicon wafer into the suspension 42 of the present invention is through photolithographic methods such as photolithographic etching. Such methods as known in the photolithographic processing art allow consistent creation of suspensions 42 with very thin and long microbeams 60. However, even such photolithographic processes as potassium hydroxide etching and DRIE Deep Reactive Ion Etch are limited in their capability to etch such deep, thin and long microbeams 60.

Figure 6:
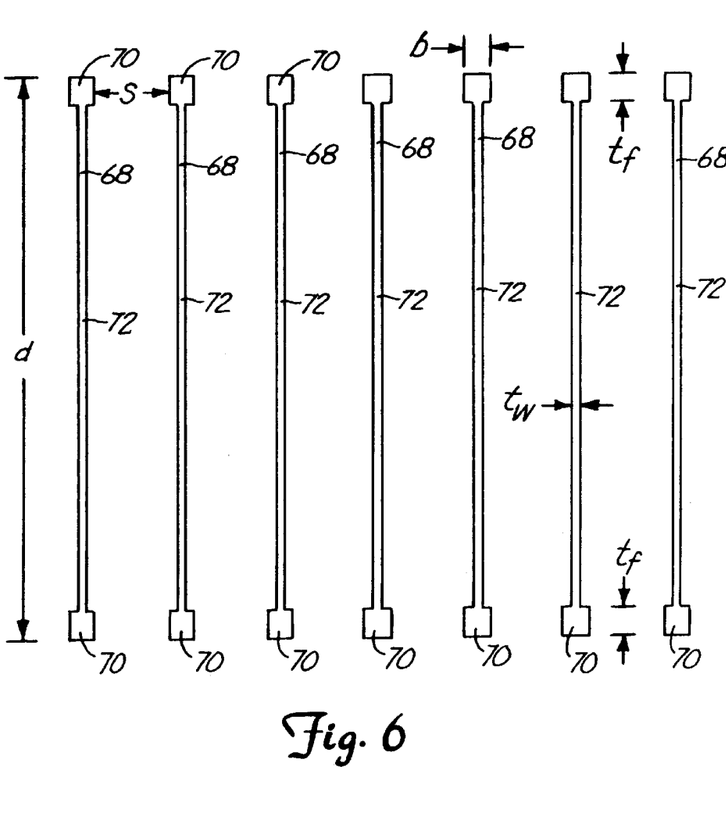
FIG. 6 is a cross sectional view of an alternative design of the microbeams of the present invention.

The vertical strength to lateral stiffness ratio of the microbeams 60 of the present invention is further increased by modifying the cross-sectional shape of the microbeam from rectangular, such as the preferred embodiment shown in FIG. 6. The microbeam shown in FIG. 6 has material removed from the rectangular microbeam to form an "I" shaped microbeam 68. The "I" shaped microbeam 68 has two flanges 70 connected by a web 72.

Thinner flanges 70 and a thinner web 72 will result in increased vertical strength to lateral stiffness ratios. The minimum flange thickness $t_f$ and minimum web thickness $t_w$ is primarily dependent upon process constraints, that is, the flanges 70 and the web 72 must have some minimum thickness to allow the "I" shaped microbeam 68 to be fabricated reliably. The flanges 70 will preferably each have a flange thickness $t_f$ which is less than 25% of the microbeam thickness d, and more preferably each about 5% of the microbeam thickness d. The web 72 will preferably have a web thickness $t_w$ which is less than 50% of the microbeam width b, and more preferably about 20 to 35% of the microbeam width b. In the preferred embodiment shown in FIG. 6, the flanges 70 each have a thickness $t_f$ of 10 μm, and the web 72 has a thickness $t_w$ of 3 μm.

The strength and stiffness of the "I" shaped microbeam 68s can be modeled by the above formulas based on the change in moments of inertia $I_v$ and $I_L$ due to the material removal. Using the same microbeam thickness d=200 μm and microbeam width b=10 μm (i.e., equal to the microbeam thickness d and width b of the embodiment of FIG. 3), the moment of inertia $I_L$ in the lateral direction can be determined by adding the contributions of the thinned and unthinned regions together:

$$I_L = 2t_f b_f^3/12 + (d-2t_f)t_w^3/12 = 2(10)(10)^3/12 + (200-2(10))(3)^3/12 = 2071 \; \mu m^4$$

The moment of inertia $I_v$ in the vertical direction can be more easily determined by subtracting the contribution of the removed material from the original rectangular cross-section:

$$I_v = bd^3/12 - (b-t_w)(d-2t_f)^3/12 = (10)(200)^3/12 - (10-3)(200-2(10))^3/12 = 3,264,666 \; \mu m^4$$

The moment of inertia in the vertical direction is thus 1576 times the moment of inertia of the microbeams 68 in the lateral direction, as compared to the ratio of 400 times provided by the rectangular microbeams 60 of FIG. 3. That is, the "I" shaped microbeam 68 provides an improvement factor of 3.94 in lateral deflection over the rectangular microbeam 60 of the same width and thickness.

Using the formula for maximum stress σ of $$\sigma = W_v Lc/I_v n$$

the number of microbeams 68 needed to reduce the maximum stress below 100 MPa is $$n = W_v Lc/I_v \sigma = (40,000)(1000)(200/2)/(3,264,666)(100) = 12.25$$

Thus fourteen microbeams 68, in two groups of seven on each side, are needed. With fourteen microbeams 68, the maximum stress σ is $$\sigma = W_v Lc/I_v n = (40,000)(1000)(200/2)/(3,264,666)(14) = 88 \text{ Mpa}$$

the lateral spring constant for the suspension 42 is:

$$nP/x = 12nEI_L/L^3 = (12)(14)(130,000)(2071)/1000^3 = 45 \text{ N/m}$$

and the maximum continuous lateral deflection of the microactuator 40 is:

$$x = nPL^3/12nEI_L = (100)(1000)^3/(12)(14)(130,000)(2071) = 2.21 \ \mu m$$

As can be seen by comparing the microspring 52 with 10 μm wide rectangular microbeams 60 (FIG. 3) against this example with 10 μm wide "I" shaped microbeams 68, the "I" shaped microbeams 68 provide significant additional lateral flexibility without a corresponding loss of vertical strength.

The beneficial results of the "I" shaped microbeams 68 are understood as follows. In the vertical direction, the material removed is located toward the center of the microbeam 68 where it has relatively little contribution to the microbeam's vertical strength and vertical stiffness. In the lateral direction, the material removed is located toward the outside surface of the microbeam 68 where it provides the maximum possible contribution to the lateral stiffness. Formation of "I" shaped microbeams 68 thus results in a large decrease in lateral stiffness. Workers skilled in the art will appreciate that the microbeams of the present invention may have may cross-sectional shapes other than "I" shaped, and, by properly selecting the location where material is removed from the rectangular shape, similarly obtain the benefits of the present invention.

Figure 7:
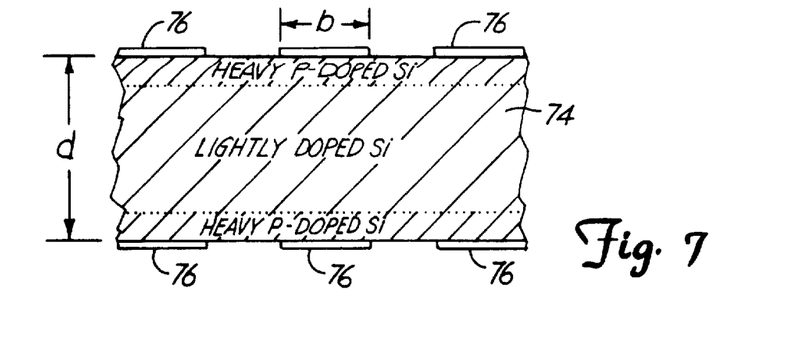
FIG. 7 is a cross sectional view of an in process silicon wafer for the "I" shaped microbeams.

The "I" shaped microbeams 68 are preferably produced by photolithographic methods, and more preferably by adding a surface doping step and a simple wet chemical etch step to the process used to create the rectangular microbeams 60 of FIG. 5. The preferred fabrication process is exemplified in FIGS. 7–9, in which the width is exaggerated relative to thickness for ease of explanation. The process starts out by cutting or otherwise forming a single crystal silicon wafer 74 having a thickness d. To form the "I" shaped microbeams 68, the wafer 74 is treated along its surfaces with a treatment that does not extend through the full thickness d of the wafer. For instance, the wafer 74 may be lightly doped throughout its thickness, but heavily doped, such as with p-doping, on one or (more preferably) both surfaces to a depth of the flange thickness $t_f$. If only rectangular microbeams 60 are desired, the surface treatment step may be omitted. A photoresist mask 76 is placed on the wafer 74 to protect the microbeams 60 and define microbeam width b. A cross-section of the doped wafer 74 with the photoresist mask 76 in place is shown in FIG. 7.

Figure 8:
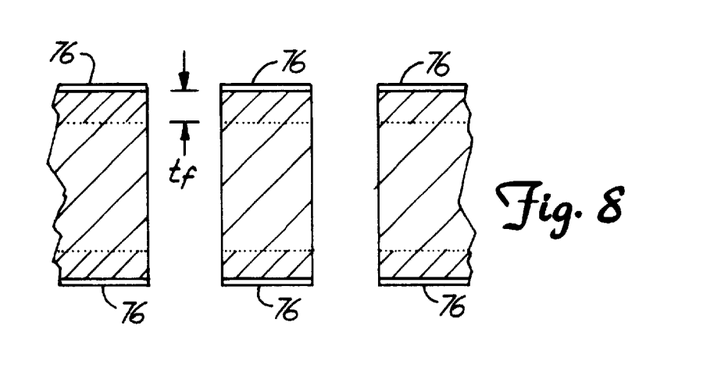
FIG. 8 is a cross sectional view of a second step in the fabrication process of the "I" shaped microbeams.

A material removal process is then used to remove material not protected by the photoresist mask 76. For instance, potassium hydroxide etching with a <110> crystal orientation can be used to form nearly rectangular sections, or DRIE may be used to form rectangular sections. FIG. 8 shows the microbeams 68 after the material removal process.

Figure 9:
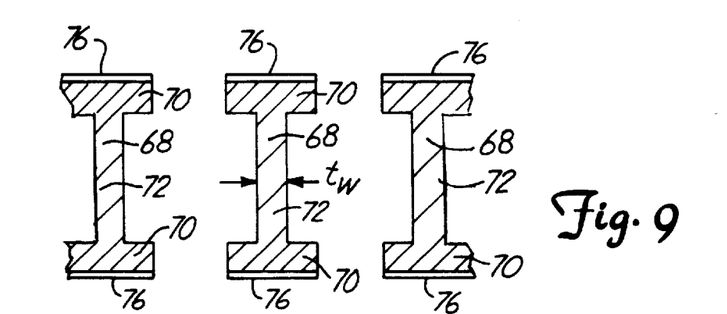
FIG. 9 is a cross sectional view of a third step in the fabrication process of the "I" shaped microbeams.

To form the "I" shaped microbeams 68, the wafer 74 with the photoresist mask 76 still in place is then placed in a wet chemical etch. As known in the silicon etching art, etches are available that are doping selective, that is, that will etch highly doped silicon much more rapidly than lightly doped silicon, and also vice versa. For instance, an ethylene-diamine-pyrocatechol-water mixture may be used to remove the lightly doped silicon material much more rapidly than the heavily p-doped silicon material The rectangular section is etched to the desired thickness $t_w$ by control of etch time, with little or no attack to the flanges 70. Similar results could be obtained by starting with a heavily doped wafer with lightly doped epi layers on one or both surfaces, and using and etch such as $HF/HNO_3/CH_3COOH$, that attacks heavily doped Si of either type 15 times faster than the lightly doped epi layers. The "I" shaped microbeams 68 after the wet chemical etch are shown in FIG. 9. Finally, the photoresist mask 76 is removed to leave the "I" shaped microbeams 68 shown in FIG. 6.

Figure 10:
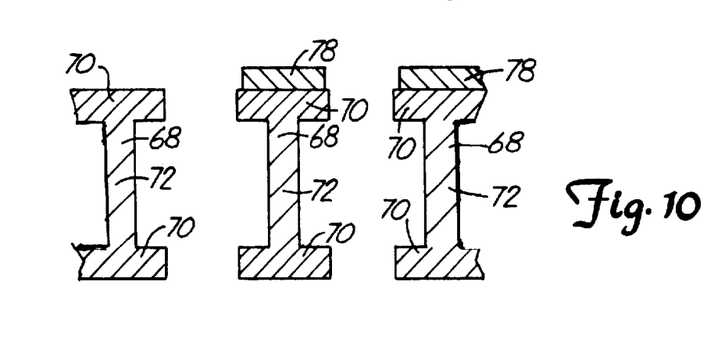
FIG. 10 is a cross-section view of microbeams including conductive leads.

With the additional lateral flexibility provided by the microbeams 60, 68 of the present invention, electrically conductive leads 78 for the transducer may be fabricated directly on the microbeams 60, 68. With the "I" shaped microbeams 68, the flange width b can be wider than the width b of the corresponding rectangular microbeams 60 of the same lateral flexibility. The wider flange width b lends further room to lay down the leads 78. A cross-sectional view of microbeams 68 with such leads 78 is shown in FIG. 10. The leads 78 are preferably placed on the microbeams 60, 68 through a photolithographic process.

Typical read-write MR heads require four such leads 78, and thus the leads 78 need only be placed on four of the microbeams 68. Preferably the leads 78 will be symmetrically positioned relative to the longitudinal axis 62 (shown in FIGS. 3 and 4), such that two of the leads 78 will be placed on one group of microbeams 60, 68 and the other two leads will be oppositely placed on the other group of microbeams 60, 68.

Placing leads 78 for the transducer on the microbeams 60, 68 eliminates the need for a separate flex circuit carrying leads to the slider 22. Otherwise, the added lateral stiffness of the flex circuit will further act to limit the amount of deflection achieved by the microactuator 40. Even when the leads 78 are placed on the microbeams 60, 68, the flexibility of the conductive leads 78 may have a significant effect on the lateral flexibility of the microspring 52. Workers skilled in the art will appreciate that the leads 78 should be fabricated and shaped to increase lateral stiffness of the microbeams 60, 68 as little as possible, subject to the necessary electrical and process requirements of the leads 78.

Although the present invention has been described with reference to preferred embodiments, workers skilled in the art will recognize that changes may be made in form and detail without departing from the spirit and scope of the invention. For instance, workers skilled in the art will appreciate that numerous modifications can be made to the cross-sectional and/or plan view shape of the microbeams while achieving the various objectives stated herein to a greater or lesser extent. As another example, the slider attachment pad could potentially be fabricated as a portion of the slider itself, or the suspension arm attachment pad could be fabricated as a portion of the suspension arm.

What is claimed is:

1. A method of forming a suspension for supporting a slider having a transducer mounted thereon, the method comprising:

defining:
- a suspension arm attachment pad;
- at least one microbeam extending from the suspension arm attachment pad, the microbeam having a width and a height measured substantially normal to the width the first microbeam having a length greater than both the height and the width; and
- a slider attachment pad connected to the microbeam the slider attachment pad for connection to a slider such that the first microbeam supports at least part of a preload force placed on the slider and directed substantially normal to the length; and attaching a conductive lead for the slider mounted transducer to the microbeam such that the conductive lead runs along the length of the microbeam.

2. The method of claim 1, wherein the microbeam comprises:
- a web; and
- a flange attached to the web and wider than the web.

3. The method of claim 1, further comprising:
attaching a biasing mechanism to bias the slider attachment pad laterally relative to the suspension arm attachment pad by bending of the microbeam.

4. A method of forming one or more microbeams in a suspension for a slider, the method comprising:

forming a first microbeam having two opposing sides and a width therebetween, the first microbeam having a height measured substantially normal to the width, the first microbeam having a length greater than both the height and the width, the first microbeam for supporting at least part of a preload force, placed on a slider supported by the suspension and directed substantially normal to the length of the first microbeam; and removing a portion of at least one of the sides to define a flange of the width and a web thinner than the width the flange and the web running along the length of the first microbeam.

5. The method of claim 4, wherein the first microbeam is an I-beam having two opposing flanges separated by the web.

6. The method of claim 4 wherein the first microbeam is one of a first plurality of microbeams running side-by-side, and further comprising:

defining a slider attachment pad having a first side from which the first plurality of microbeams extend;

defining a second plurality of microbeams running side-by-side and extending from the slider attachment pad on a second side of the slider attachment pad opposite the first side; and defining a suspension arm attachment pad connected to the first plurality of microbeams and to the second plurality of microbeams;

the first and second plurality of microbeams being adapted to support the pre-load force placed on the slider attachment pad relative to the suspension arm attachment pad.

7. The method of claim 6, wherein each of the first plurality of microbeams are separated from a neighboring microbeam by a first spacing, wherein each of the second plurality of microbeams are separated from each of the first plurality of microbeams by a distance wider than the first spacing.

8. The method of claim 6, further comprising:
- an actuator arm; and
- a suspension arm, with the suspension arm attachment pad attached to the suspension arm.

9. The method of claim 6, wherein each of the first plurality of microbeams and each of the second plurality of microbeams extend integrally into the slider attachment pad.

10. The method of claim 4, further comprising attaching a conductive lead for a transducer such that the conductive lead runs along the flange.

11. The method of claim 4, wherein the forming a first microbeam step comprises:

forming a wafer having a wafer thickness defining the height; and removing portions of the wafer to define the two opposing sides of the first microbeam.

12. The method of claim 11, wherein the removing step comprises:

placing photoresist over the wafer to define the first microbeam; and deep reactive ion etching through locations on the wafer not protected by photoresist.

13. The method of claim 4, wherein the removing step comprises:

treating at least one surface of the first microbeam to a flange thickness;

etching the first microbeam for a duration such that non-treated material is removed to a web thickness, while treated material is retained through the etch to define the flange at the width and flange thickness.

14. The method of claim 13, wherein the wafer is lightly doped silicon, wherein the treating step is performed by heavy p-type doping the surface of the wafer to a surface depth of the flange thickness, and wherein the etching is performed with a solution selected from the group consisting of:

ethylene-diamine-pyrocatechol-water; and $HF/HNO_3)CH_3COOH$.

15. The method of claim 4 further comprising:

forming a slider attachment pad having a first side on which the first microbeam extends;

forming a second microbeam running side-by-side with the first microbeam and extending on the first side of the slider attachment pad, and forming at least a third microbeam and a fourth microbeam running side-by-side and extending on a second side of the slider attachment pad opposite the first side.

16. The method of claim 4, further comprising attaching a conductive lead for a transducer to one of the flange and the web such that the conductive lead runs along said one of the flange and the web.

* * * * *

UNITED STATES PATENT AND TRADEMARK OFFICE
CERTIFICATE OF CORRECTION

PATENT NO. : 6,239,952 B1
DATED : May 29, 2001
INVENTOR(S) : Wayne Allen Bonin

It is certified that error appears in the above-identified patent and that said Letters Patent is hereby corrected as shown below:

<u>Column 3,</u>
Line 48, delete "transit", insert -- transmit --

<u>Column 13,</u>
Line 44, delete "may", insert -- many --

<u>Column 15,</u>
Line 38, delete "force,", insert -- force --

<u>Column 16,</u>
Line 48, delete "HF/HNO$_3$)CH$_3$COOH.," insert -- HF/HNO$_3$/CH$_3$COOH. --

Signed and Sealed this

Thirteenth Day of August, 2002

*Attest:*

JAMES E. ROGAN
*Attesting Officer*     *Director of the United States Patent and Trademark Office*